United States Patent
Nishijima

(10) Patent No.: US 7,004,232 B1
(45) Date of Patent: Feb. 28, 2006

(54) OIL COOLING OIL TANK

(76) Inventor: Jo Nishijima, 3412 Red Oak Dr., Bowling Green, KY (US) 42104

( * ) Notice: Subject to any disclaimer, the term of this patent is extended or adjusted under 35 U.S.C. 154(b) by 276 days.

(21) Appl. No.: 10/108,883

(22) Filed: Mar. 28, 2002

(51) Int. Cl.
*B60H 3/00* (2006.01)
*B61D 27/00* (2006.01)
*B60K 11/00* (2006.01)

(52) U.S. Cl. .......................... 165/44; 165/47; 180/68.1
(58) Field of Classification Search ................. 165/41, 165/44, 47, 916; 180/68.1, 68.2, 68.3, 68.4, 180/219, 229, 225; 60/467; 184/104.1, 184/104.3; 123/196 AB, 196 S, 41.5, 41.51, 123/41.82 R See application file for complete search history.

(56) References Cited

U.S. PATENT DOCUMENTS

| 1,161,493 | A | * | 11/1915 | MacFarren ................. 123/41.5 |
| 1,404,304 | A | * | 1/1922 | La Monte .................... 165/51 |
| 2,095,058 | A | * | 10/1937 | Cross .......................... 165/44 |
| 2,781,859 | A | * | 2/1957 | Warren ................. 123/196 AB |
| 3,945,463 | A | * | 3/1976 | Okano et al. ............... 180/225 |
| 4,031,953 | A | * | 6/1977 | Kline ...................... 165/52 X |
| 4,413,700 | A | * | 11/1983 | Shiratsuchi ................ 180/219 |
| 4,445,587 | A | | 5/1984 | Hillman |
| 4,478,306 | A | * | 10/1984 | Tagami .................... 165/41 X |
| 4,516,630 | A | * | 5/1985 | Yamaguchi ................... 165/47 |
| 4,557,345 | A | * | 12/1985 | Hamane et al. ............ 180/68.1 |
| 4,618,020 | A | * | 10/1986 | Noda et al. ................ 180/68.4 |
| 4,632,206 | A | * | 12/1986 | Morinaka et al. ......... 165/41 X |
| 4,640,341 | A | | 2/1987 | Ozawa |
| 4,662,470 | A | * | 5/1987 | Fujisawa et al. ........... 165/44 X |
| 4,690,236 | A | * | 9/1987 | Shinozaki et al. .......... 180/219 |
| 4,830,135 | A | * | 5/1989 | Yamashita ................. 180/68.1 |
| 4,982,973 | A | * | 1/1991 | Saito et al. ............ 180/68.1 X |
| 5,031,580 | A | * | 7/1991 | Takagi et al. ............. 123/41.42 |
| 5,307,865 | A | | 5/1994 | Inagaki et al. |
| 5,458,101 | A | * | 10/1995 | Crooks .................... 123/196 S |
| 5,566,746 | A | * | 10/1996 | Reise .......................... 165/41 |
| 5,887,561 | A | * | 3/1999 | Spurgin ................ 123/196 AB |
| 5,967,111 | A | | 10/1999 | Hedman |
| 5,975,230 | A | * | 11/1999 | Bourget ....................... 180/229 |
| 5,992,554 | A | * | 11/1999 | Hasumi et al. ........... 123/41.51 |
| 6,032,621 | A | * | 3/2000 | Tateshima ............ 123/41.82 R |
| 6,105,668 | A | | 8/2000 | Schwarz et al. |
| 6,186,550 | B1 | * | 2/2001 | Horii et al. .................. 180/225 |
| 6,332,505 | B1 | * | 12/2001 | Tateshima et al. ......... 180/68.4 |
| 6,659,051 | B1 | * | 12/2003 | Shiomi et al. ......... 123/196 AB |

FOREIGN PATENT DOCUMENTS

JP 11-325754 * 11/1999

* cited by examiner

*Primary Examiner*—Ljiljana Ciric
(74) *Attorney, Agent, or Firm*—James E. Cole; Middleton Reutlinger

(57) ABSTRACT

An oil cooling apparatus having at least two sides. Extending from a first side and integral therewith is a first scoop defining a first duct. Extending from a second side and integral therewith is a second scoop defining a second duct. Within the first and second ducts are oil coolers having fins which allow heat to be removed from the oil as air passes through the duct during operation of the, for instance, motorcycle. After moving through the first and second oil coolers, the oil is deposited within the oil tank until it is recirculated through an engine.

17 Claims, 3 Drawing Sheets

OIL COOLING OIL TANK

BACKGROUND OF THE INVENTION

1. Technical Field of the Invention

The present invention relates generally to an oil tank for motor vehicles. More particularly, the invention is an oil tank for motorcycles having an oil cooling system in fluid communication with the oil tank.

2. Description of the Related Art

In the prior art, a plurality of engine oil cooling systems have been employed in order to maintain proper viscosity in vehicle engines, particularly motorcycles. For instance U.S. Pat. No. 5,967,111 teaches an oil filter which increases cooling of oil therein by using two circulation areas wherein oil may flow in a first circulation area and coolant may flow in a second area adjacent the first area. However, this system requires the use of a liquid to cool the engine oil.

In U.S. Pat. No. 5,887,561 an oil cooler for a motorcycle is shown. The oil cooler provides a flow diverter from the oil line through the engine guard for circulation through a chamber within the engine guard. This system uses a thermostat to cause the diverter to direct oil through the circulation chamber when the engine oil reaches, for instance, 180 degrees. This system however, is susceptible to causing major engine to damage if the thermostat malfunctions and the engine continue to run since the engine oil would not be cooled.

In U.S. Pat. No. 5,307,865 an engine oil cooling system is provided for use with a motorcycle. Although this system describes an oil cooler mounted on an oil pan, the system further requires a system for engine cooling with water. Moreover, this system may bypass the oil cooler in order to regulate oil viscosity in colder climates.

In view of the deficiencies in known oil cooling systems for air cooled engines, it is apparent that an oil cooler is needed for use with a motorcycle oil tank wherein motor oil passes through an oil cooler before entering the oil tank, thereby decreasing the temperature of the motor oil before it enters the oil tank. Moreover it is preferable that an air scoop be integral with the oil tank and route air over both the oil cooler and the surface of the oil tank to further cool the motor oil therein.

SUMMARY OF THE INVENTION

It is an object of the present invention to provide an oil cooler for an air cooled engine of a motor vehicle.

It is an even further object of the present invention to have an oil cooler integral with an oil tank and in fluid communication therewith.

It is still an even further object of the present invention to provide an oil tank having an air duct defined by at least one scoop and the oil tank wherein the oil cooler may be disposed to transfer heat from the oil as the vehicle is driven.

It is yet an even further object of the present invention to provide dual cooling of motor oil by passing the oil through two oil coolers disposed in air ducts wherein air is directed therethrough during operation of the motor vehicle.

It is an even still further object of the present invention to provide a one-piece oil cooling oil tank which allows for modular removal and replacement.

Accordingly, an oil cooling oil tank is set forth comprising an oil tank having a first side, a second side, and a third side and being substantially U-shaped. A first duct is defined by a first side of the oil tank and a first scoop extending from the first side. A second duct is defined by a second side of the oil tank and a second scoop extending from the second side. The first scoop and the second scoop are integral with said oil tank, preferably either formed therewith or welded thereto. A first oil cooler is disposed in the first duct and a second oil cooler is disposed in the second duct. The first oil cooler is in fluid communication with the second oil cooler. The second oil cooler is also in fluid communication with the oil tank while the first oil cooler is in fluid communication with an oil return inlet line.

The oil cooling oil tank further comprises a neck extending from an upper surface of the oil tank having an aperture therein for filling the tank with oil. The oil cooling oil tank further comprising a vent line extending from and in fluid communication with said oil tank. The oil cooling oil tank further comprises an oil tank outlet line in fluid communication with said oil tank.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Provided herein is a system for cooling oil on an air cooled vehicle engine, such as the type manufactured by Harley-Davidson Motorcycle Company. Generally, oil tanks supply oil to a combustion engine by means of a pump. The oil is circulated through the engine to moving parts in order to lubricate sliding surfaces and remove heat from those surfaces. Once the oil is circulated through the engine it is forced back to the oil tank or oil pan where it may be cooled before being recirculated through the engine.

Figure 1:
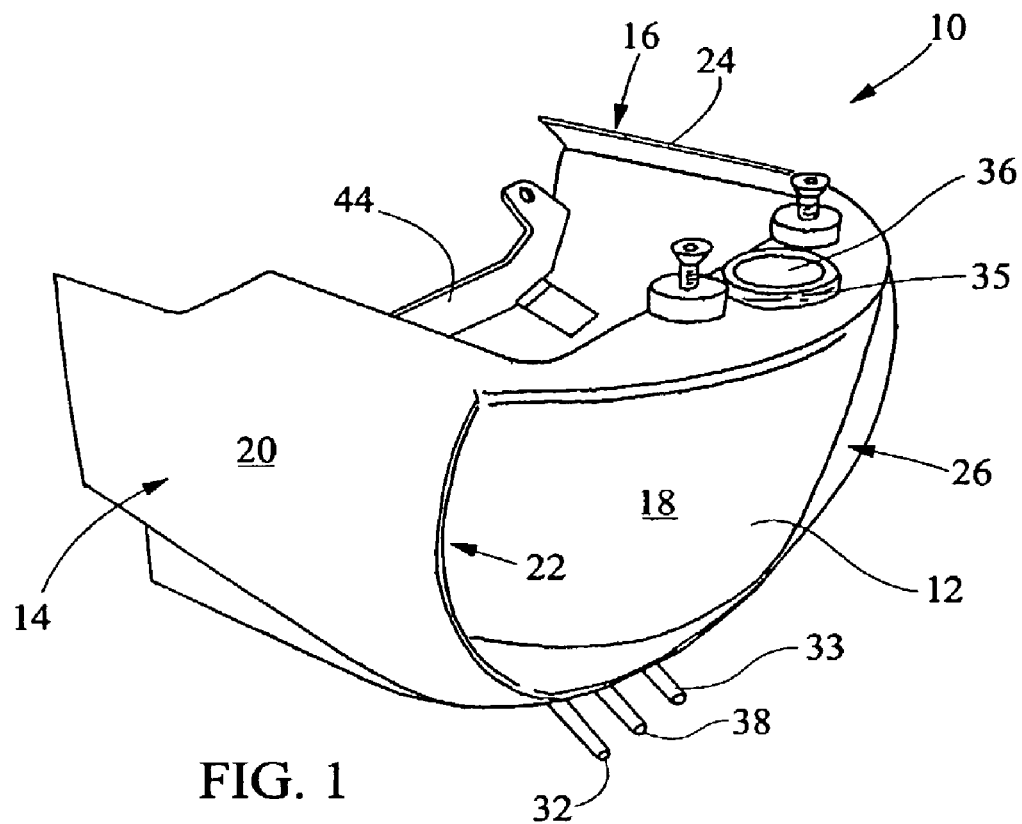
FIG. 1 shows a perspective view of the oil cooling oil tank of the present invention.
Figure 2:
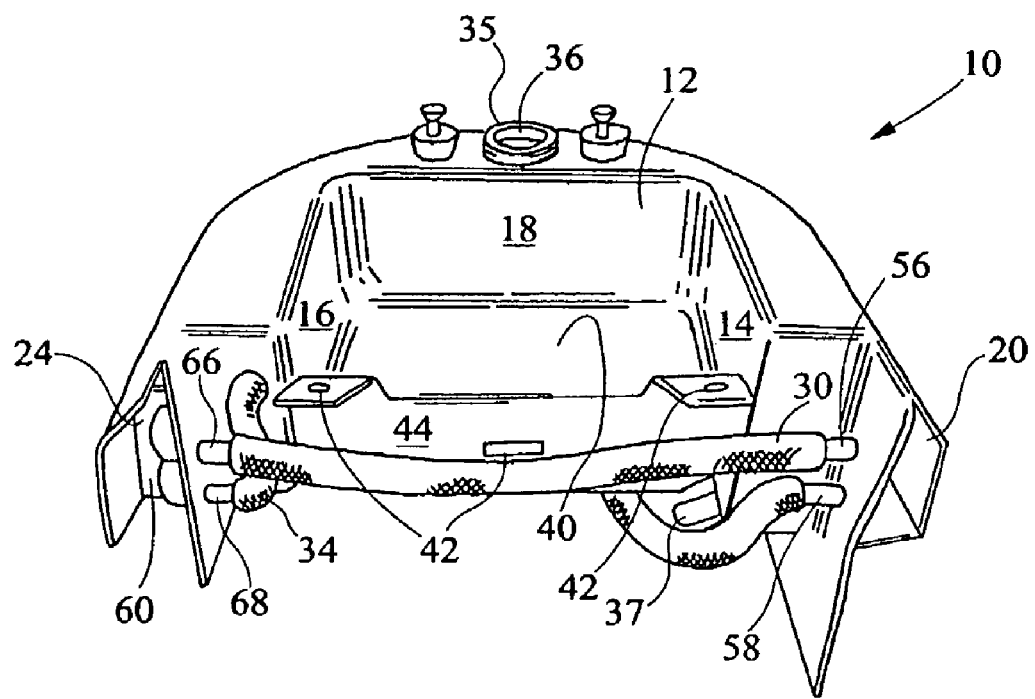
FIG. 2 shows a rear perspective view of the oil cooling oil tank of FIG. 1.

As shown in FIGS. 1,2, an oil tank with oil cooler 10 is shown comprising an oil tank 12 having three sides forming a substantially U-shaped container. A first side 14 is opposite a second side 16 and is connected to the second side 16 by a third side 18 thereby forming a substantially U-shaped structure. One skilled in the art will recognize that any shape may be used for the tank 12 such that the oil tank 12 fits within the engine compartment and frame of the motor vehicle for which it is used. An inner portion of the oil tank 12 is hollow wherein motor oil is stored and from where it may be pumped to lubricate the parts of a combustion engine. The oil tank 12 is preferably formed of steel or some other durable material which will not be compromised by the oil stored therein.

Figure 3:
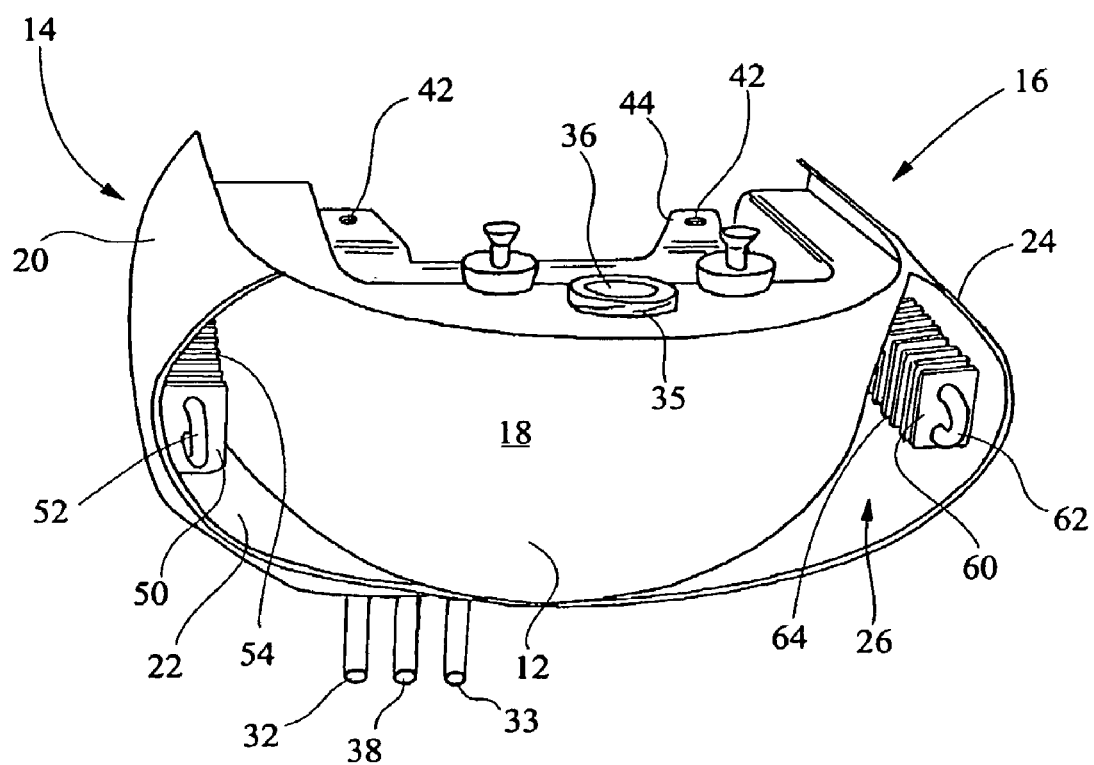
FIG. 3 shows a front perspective view of the oil cooling oil tank of FIG. 1.

Referring now to FIGS. 1 and 3, extending from a first side 14 of oil tank 12 is a first scoop 20. The first scoop 20 is integral with the oil tank 12 and has a curved shape which extends from an upper portion of the first side 14 and returns to a lower portion of first side 14. More specifically, the first scoop 20 may have a semi-cylindrical curved shape when viewed from the front as in FIG. 3. By extending from the first side 14 of oil tank 12, a first duct 22 is formed. In other words, the first scoop 20 and the first side 14 of oil tank 12 define an air duct 22. The oil tank 12 is preferably oriented such that as the vehicle is driven, the first scoop 20 directs air through first duct 22 and over an oil cooler 50 therein.

Extending from a second side 16 of oil tank 12 is a second scoop 24. The second scoop 24 may extend from an upper portion of the second side 16 of oil tank 12 and returns to the oil tank 12 at a lower surface of the second side 16 of the oil tank 12. As with the first scoop 20, the second scoop 24 has a semi-cylindrical shape when view from the front as in FIG. 3. The oil tank 12 and the second scoop 24, in combination, define a second duct 26 wherein air may be directed when the vehicle is driven. A grill material may be positioned over the ducts 22,26 to prevent debris from damaging the ducts, oil coolers 50,60 therein, or oil tank sides 14,16.

An oil return inlet line 32 is disposed along the oil tank 12 and maintains flow communication between an oil line preferably exiting an engine crankcase and a first oil cooler 50 disposed within the first duct 22. More specifically, the oil return inlet line 32 is in fluid communication with coupling 58 of oil cooler 50. The first oil cooler 50 and a second oil cooler 60 may be welded into the first and second ducts 22,26 respectively.

Figure 4:
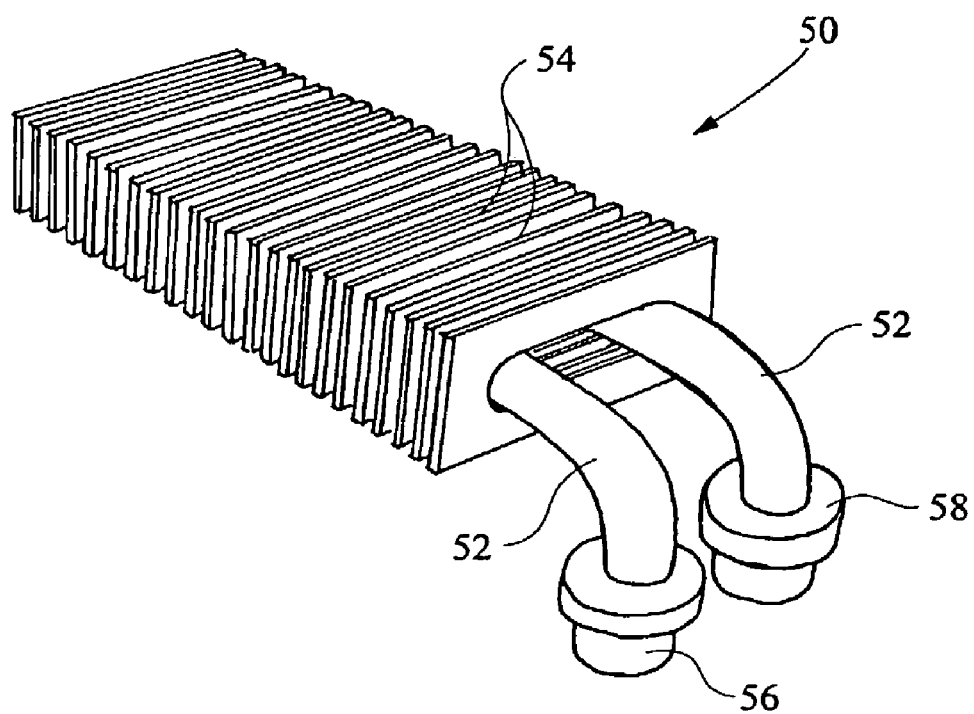
FIG. 4 shows a perspective view of the oil cooler used in the present invention; and, FIG. 5 shows a side view of the oil cooler used in the present invention.

Referring now to FIG. 4, the first oil cooler 50 comprises a substantially U-shaped tubing 52, however any tubing shape may be used. The more tubing 52 being positioned in the first and second ducts 22,26 the greater the amount of heat transfer which takes place and therefore the cooler the oil becomes. Fins 54 are positioned in a spaced configuration along the length of the tubing 52. The fins 54 may be any shape however larger surface areas are preferable in order to better transfer heat. The tubing 52 carries the oil to the oil tank 12 and also transfers heat from the oil to the fins 54. The fins 54 provide surface area to transfer heat from the oil as air passes over. The first oil cooler 50 has two couplings 56,58. The first coupling 58 receives oil from the oil return inlet line 32 and the second coupling 56 directs oil exiting the first oil cooler 50 to a second oil cooler 60 through oil return line 30.

Figure 5:
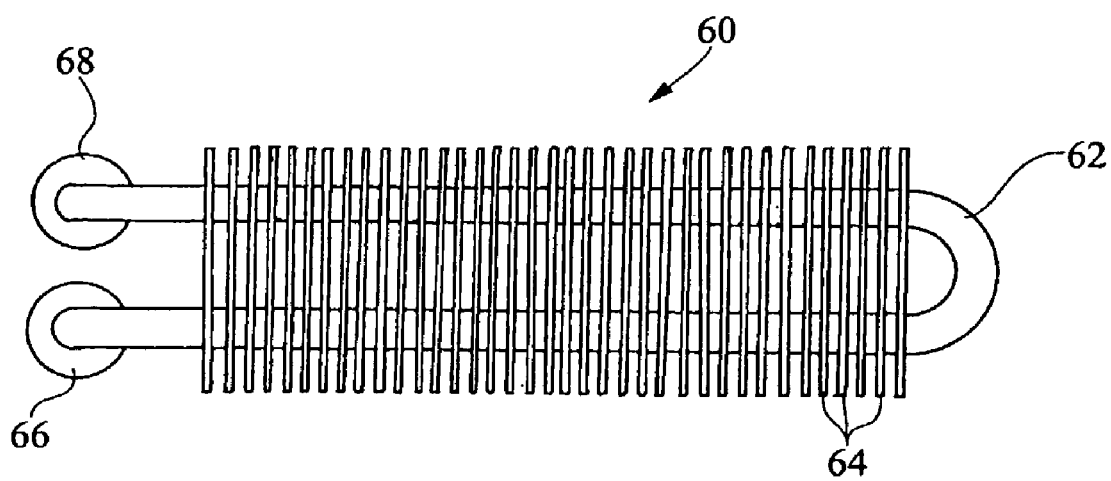

As shown in FIG. 5, the second oil cooler 60 may also be comprised of a substantially U-shaped tubing 62 having first and second couplings 66,68. Disposed about the tubing 62 in a spaced configuration are a plurality of fins 64. The fins 64 are preferably square or rectangular in shape to provide a maximum surface area from which to transfer heat. Oil is received from first oil cooler 50 through first coupling 66. As the tubing 62 carries hot oil through the second oil cooler 60 the heat from the oil transfers to the fins 64 and then to the air which passes through the second duct 26. The tubing 52 and 62 may alternatively coil or serpentine within the first and second ducts 22,26 to increase exposure to air passing therethrough. Finally, an oil return outlet line 34 is in fluid communication with second coupling 68 for depositing oil within the oil tank 12. Thus, in this process the oil is cooled twice before being deposited in the oil tank 12.

As seen in FIGS. 1,2 a first plate 40 connects lower surfaces of the first side 14 and second side 16 and may have a plurality of holes 42 therein. A second plate 44 may extend across a rear portion of the oil tank 12, as shown in FIG. 2. The first and second plates 40,44 effectively form a mounting bracket for the oil cooling oil tank 10, allowing attachment to a motorcycle engine or frame.

Referring now to FIGS. 1–3, on a top surface of the third side 18 is a neck 35 having an aperture 36 in the upper portion of the neck. The neck 35 may have a threaded upper portion where a threaded cap may be disposed. The aperture 36 may be used to fill the oil tank 12 with oil needed for operation of the engine.

Extending from a lower surface of the oil tank 12 is a vent line 38 which extends upward through the inner portion of the oil tank 12. The vent line 38 prevents vapor lock and enhances flow of oil through the engine.

Another line extends from the lower portion of the oil tank 12. An oil tank outlet line 33 is positioned through the lower surface of the oil tank 12 and is preferably disposed at a low position or sump of the oil tank 12 wherein the oil inside the oil tank 12 may collect for gravity-feeding to an oil pump. This inhibits air from entering the oil tank outlet line 33 and causing cavitation which may damage an oil pump (not shown). Referring to FIG. 2 a drain 37 is shown. The drain 37 may be used to purge oil from the oil system when, for instance, changing the oil.

In use, the oil tank 12 is connected to a motorcycle frame or engine. The connection may be by welding or bolting the oil tank 12 using plates 40,44. Next the oil tank outlet line 33 is connected to an oil pump. The oil return inlet line 32 is connected to an oil line which collects oil from an engine crankcase. Finally, the oil tank 12 is filled to an appropriate level through aperture 36 and the cap is replaced.

As the engine is started and a driver begins operating the vehicle, for instance a motorcycle, an oil pump begins circulating oil from the oil tank outlet line 33 to the engine. As the hot oil leaves the engine crankcase and enters the oil return inlet 32, the operation of the motorcycle causes air to be directed through the first and second ducts 22,26. Hot oil returning from the engine crankcase is first directed through the coupling 58 of the first oil cooler 50, which is positioned in the first duct 22. The tubing 52 receives the oil and transfers heat from the oil to the fins 54. Air moving through the first duct 22 removes heat from the fins 54. Next the oil passes through second coupling 58 and through an oil return line 30 to the second oil cooler 60. The oil return line 30 is preferably a braided steel tubing but may also be any other type of durable tubing as is well known in the art. The oil enters the first coupling 66 of second oil cooler 60 and moves through tubing 62. The fins 64 of second oil cooler 60 receive heat from the tubing 62 and dissipate the heat through the duct 26 as air passes therethrough. Finally, the oil passes through coupling 68 to oil return outlet line 34 and into oil tank 12. The oil remains in the oil tank 12 until it is pumped through the engine and the process is repeated. The present invention has a further advantage of dissipating heat from the oil tank since air passing through the duct further removes heat from the oil stored therein.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. An oil cooling apparatus, comprising:
    an oil tank having an oil return inlet line and an oil tank outlet line extending from said oil tank;
    a vent line and an oil tank outlet line extending from said oil tank;
    a first scoop and a second scoop extending from first and second sides of said oil tank;
    a first oil cooler disposed between said first scoop and said oil tank;
    a second oil cooler disposed between said second scoop and said oil tank;
    said oil return inlet line being in fluid communication with said first and second oil coolers, an oil return outlet line, and said oil tank;
    wherein said first oil cooler and said second oil cooler each include a tubing, a plurality of fins disposed along said tubing in a spaced configuration, and first and second couplings at an inlet and outlet, respectively, for each of said first and second oil coolers.

2. The oil cooling apparatus of claim 1 wherein said oil return inlet line, said first oil cooler, said second oil cooler, and said oil return outlet line are all in fluid communication with said oil tank and define a circuit.

3. The oil cooling apparatus of claim 1, said second oil cooler being in fluid communication with an oil return outlet line extending into an inner portion of said oil tank.

4. The oil cooling apparatus of claim 1 wherein said first and second oil coolers each include a substantially U-shaped tubing, a plurality of fins disposed about said U-shaped tubing in a spaced configuration, and first and second couplings at an inlet and outlet, respectively, of each of said first and second oil coolers.

5. The oil cooling apparatus of claim 1 further comprising an aperture for filling said oil tank.

6. The oil cooling apparatus of claim 1 further comprising a vent line extending from an outer portion of said oil tank to an inner portion of said oil tank.

7. An oil cooling apparatus, comprising:
a substantially U-shaped oil tank having a hollowed inner portion and first and second opposed sides connected by a third side;
a first scoop disposed on said first side of said oil tank;
a second scoop disposed on said second side of said oil tank;
a first oil cooler disposed between said first scoop and said first side of said oil tank;
a second oil cooler disposed between said second scoop and said second side of said oil tank;
an oil return inlet line in fluid communication with said first oil cooler;
said first oil cooler being in fluid communication with said second oil cooler;
said second oil cooler being in fluid communication with said oil tank;
a vent line extending from said inner portion of said oil tank; and,
an oil tank outlet line extending from said inner portion of said oil tank;
wherein said first and second oil coolers each include a substantially U-shaped tubing, a plurality of fins disposed about said U-shaped tubing in a spaced configuration, and first and second couplings at an inlet and outlet, respectively, of each of said first and second oil coolers.

8. The oil cooling apparatus of claim 7 wherein said first oil cooler is in flow communication with an oil return inlet line and said second oil cooler is in flow communication with an oil return outlet line.

9. The oil cooling apparatus of claim 7 further comprising an aperture for filling said oil tank.

10. The oil cooling apparatus of claim 9, further comprising a drain positioned on said oil tank.

11. An oil cooling apparatus, comprising:
an oil tank having at least a first side and a second side and being substantially U-shaped;
a first duct defined by a first side of said oil tank and a first scoop extending from said first side;
a second duct defined by a second side of said oil tank and a second scoop extending from said second side;
said first scoop and said second scoop being integral with said oil tank;
a first oil cooler disposed in said first duct;
a second oil cooler disposed in said second duct and in fluid communication with said first oil cooler;
said second oil cooler in fluid communication with said oil tank via an oil return outlet; and,
an oil return inlet in fluid communication with said first oil cooler;
wherein said first and second oil coolers each include a substantially U-shaped tubing, a plurality of fins disposed about said U-shaped tubing in a spaced configuration, and first and second couplings at an inlet and outlet, respectively, of each of said first and second oil coolers.

12. The oil cooling apparatus of claim 11 further comprising a neck extending from an upper surface of said oil tank and having an aperture therein.

13. The oil cooling apparatus of claim 11 further comprising a vent line extending from and in fluid communication with said oil tank.

14. The oil cooling apparatus of claim 11 further comprising a drain in fluid communication with said oil tank.

15. The oil cooling apparatus of claim 11 further comprising an oil tank outlet line in fluid communication with said oil tank.

16. An oil cooling apparatus, comprising:
an oil tank having a first side and a second side;
a first air duct defined by a first air scoop and said first side or said oil tank;
a second air duct defined by a second air scoop and said second side of said oil tank;
said first air scoop and said second air scoop being substantially semi-cylindrical in shape;
first and second oil coolers disposed in said first duct and said second duct, respectively;
an oil outlet line in fluid communication with said oil tank;
an oil return inlet line in fluid communication with said first oil cooler;
said first oil cooler in fluid communication with said second oil cooler;
said second oil cooler in fluid communication with a oil return outlet;
said oil return outlet in fluid communication with said oil tank;
said oil tank including a drain;
wherein said first oil cooler and said second oil cooler each include a tubing, a plurality of fins disposed along said tubing in a spaced configuration, and first and second couplings at an inlet and outlet, respectively, for each of said first and second oil coolers.

17. An oil cooling apparatus, comprising:
an oil tank having a hollowed inner portion and at least a first side and a second side;
a first scoop disposed on said first side of said oil tank;
a second scoop disposed on said second side of said oil tank;
a first oil cooler disposed within said first scoop;
a second oil cooler disposed within said second scoop;
an oil return inlet line in fluid communication with said first oil cooler;
said first oil cooler being in fluid communication with said second oil cooler;
said second oil cooler being in fluid communication with an oil return outlet line and with said oil tank;
a vent line extending from said oil tank; and,
an oil tank outlet line extending from said oil tank.

* * * * *